US012587350B2

(12) United States Patent
Dalsgaard

(10) Patent No.: US 12,587,350 B2
(45) Date of Patent: Mar. 24, 2026

(54) ENHANCED ACTIVATION OF PRIMARY SECONDARY CELL GROUP CELL (PSCELL)

(71) Applicant: Nokia Technologies Oy, Espoo (FI)

(72) Inventor: Lars Dalsgaard, Oulu (FI)

(73) Assignee: Nokia Technologies Oy, Espoo (FI)

( * ) Notice: Subject to any disclaimer, the term of this patent is extended or adjusted under 35 U.S.C. 154(b) by 412 days.

(21) Appl. No.: 18/155,003

(22) Filed: Jan. 16, 2023

(65) Prior Publication Data

US 2023/0246796 A1 Aug. 3, 2023

Related U.S. Application Data

(60) Provisional application No. 63/300,295, filed on Jan. 18, 2022.

(51) Int. Cl.
*H04L 5/00* (2006.01)
*H04W 76/19* (2018.01)

(52) U.S. Cl.
CPC ........... *H04L 5/0098* (2013.01); *H04W 76/19* (2018.02)

(58) Field of Classification Search
CPC ..... H04L 5/0098; H04L 5/001; H04L 5/0023; H04L 5/0035; H04L 5/0053; H04W 76/19; H04W 24/04; H04W 24/10; H04W 72/046; H04B 7/06964; H04B 7/06968
See application file for complete search history.

(56) References Cited

U.S. PATENT DOCUMENTS

| | | | | |
|---|---|---|---|---|
| 2016/0073370 A1* | 3/2016 | Axmon | ............. | H04W 56/0015 |
| | | | | 370/350 |
| 2019/0305918 A1* | 10/2019 | Siomina | ................. | H04L 5/001 |
| 2020/0351041 A1 | 11/2020 | Lin | | |

(Continued)

FOREIGN PATENT DOCUMENTS

| | | |
|---|---|---|
| WO | 2020/192540 A1 | 10/2020 |
| WO | 2021/064670 A1 | 4/2021 |

(Continued)

OTHER PUBLICATIONS

"Views on efficient activation/de-activation mechanism for one SCG", 3GPP TSG-RAN WG4 Meeting#101-bis, R4-2201691, Agenda item: 6.22.2.2, Nokia, Jan. 17-25, 2022, 10 pages.

(Continued)

*Primary Examiner* — Ian N Moore
*Assistant Examiner* — Latresa A Mccalum
(74) *Attorney, Agent, or Firm* — Nokia Technologies Oy

(57) ABSTRACT

Systems, methods, apparatuses, and computer program products for enhanced activation of primary secondary cell are provided. For example, a method can include performing, by a user equipment, at least one of beam failure detection or radio link monitoring on a deactivated secondary cell; receiving, from a network node, an activation command for the deactivated secondary cell; determining whether at least one of the deactivated secondary cell or a transmission configuration indicator (TCI) state is known based on at least one of a status of the beam failure detection or a status of the radio link monitoring of the deactivated secondary cell; and determining an activation delay for activation of the deactivated secondary cell based on a result of the determination of whether the secondary cell or the TCI state is known.

20 Claims, 3 Drawing Sheets

(56) References Cited

U.S. PATENT DOCUMENTS

| | | | |
|---|---|---|---|
| 2021/0112619 A1* | 4/2021 | Bai | H04W 24/10 |
| 2021/0227432 A1* | 7/2021 | Zhang | H04W 76/15 |
| 2021/0251040 A1 | 8/2021 | Tang et al. | |
| 2021/0321405 A1 | 10/2021 | Cui et al. | |
| 2021/0344404 A1* | 11/2021 | Matsumura | H04W 76/19 |
| 2022/0140884 A1* | 5/2022 | Shi | H04B 7/0695 |
| | | | 370/329 |
| 2022/0225457 A1* | 7/2022 | Purkayastha | H04W 76/15 |

FOREIGN PATENT DOCUMENTS

| | | | |
|---|---|---|---|
| WO | 2021/232337 A1 | 11/2021 | |
| WO | WO-2022240345 A1 * | 11/2022 | |

OTHER PUBLICATIONS

"3rd Generation Partnership Project; Technical Specification Group Radio Access Network;NR; Radio Resource Control (RRC) protocol specification (Release 16)", 3GPP TS 38.331, V16.7.0, Dec. 2021, pp. 1-963.

"3rd Generation Partnership Project; Technical Specification Group Radio Access Network; NR; Physical layer procedures for control (Release 17)", 3GPP TS 38.213, V17.0.0, Dec. 2021, pp. 1-225.

"3rd Generation Partnership Project; Technical Specification Group Radio Access Network; NR; Requirements for support of radio resource management (Release 17)", 3GPP TS 38.133, V17.4.0, Dec. 2021, 3230 pages.

"WF on R17 further Multi-RAT Dual-Connectivity enhancements", 3GPP TSG-RAN WG4 Meeting # 101-e, R4-2120334, Agenda item: 8.22, Huawei, Nov. 1-12, 2021, 9 pages.

"Email discussion summary for [101-e][237] LTE_NR_DC_enh2", 3GPP TSG-RAN WG4 Meeting # 101-e, R4-2120379, Agenda item: 8.22, Huawei, Nov. 1-12, 2021, 78 pages.

"Msc-generator", Sourceforge, Retrieved on Jan. 21, 2023, Webpage available at : https://sourceforge.net/projects/msc-generator/.

"[Post114-e][231][R17 DCCA] SCG activation/deactivation options (Huawei)", 3GPP TSG-RAN WG2#115-e, R2-210xxxx, Agenda Item: x.x.x, Huawei, Aug. 9-27, 2021, 13 pages.

"CR on SMTC alignment in multiple SCell activation", 3GPP TSG-RAN4 Meeting #99-e, R4-2110901, Huawei, May 19-27, 2021, 5 pages.

Extended European Search Report received for corresponding European Patent Application No. 23151234.4, dated May 25, 2023, 8 pages.

"Discussion on efficient activation/de-activation mechanism for one SCG", 3GPP TSG-RAN WG4 Meeting # 101bis-e, R4-2200064, Agenda item: 6.22.2.2, MediaTek Inc, Jan. 17-25, 2022, 7 pages.

"Discussion on efficient activation/de-activation mechanism for one SCG", 3GPP TSG-RAN WG4 Meeting # 101-e, R4-2117768, Agenda item: 8.22.2.2, vivo, Nov. 1-12, 2021, 3 pages.

Office action received for corresponding European Patent Application No. 23151234.4, dated Sep. 23, 2024, 5 pages.

Notice of Allowance received for corresponding European Patent Application No. 23151234.4, dated Jun. 10, 2025, 6 pages.

Notice of Allowance received for corresponding European Patent Application No. 23151234.4, dated Jan. 31, 2025, pages.

* cited by examiner

Performing BFD and/or RLM on a deactivated PSCell — 205

Receiving an activation command for the deactivated PSCell — 210

Determining whether the PSCell and/or TCI state of the PSCell is known or unknown — 215

Applying an activation delay for the activation of the PSCell according to a result of the determination of whether the PSCell or the TCI is known or unknown — 220

ENHANCED ACTIVATION OF PRIMARY SECONDARY CELL GROUP CELL (PSCELL)

RELATED APPLICATION

This application claims priority to U.S. Provisional Application No. 63/300,295 filed Jan. 18, 2022 which is incorporated herein by reference in its entirety.

FIELD

Some example embodiments may generally relate to communications including mobile or wireless telecommunication systems, such as Long Term Evolution (LTE) or fifth generation (5G) or sixth generation (6G) radio access technology or new radio (NR) access technology, or other communications systems. For example, certain example embodiments may generally relate to systems and/or methods for enhanced activation of primary secondary cell group (SCG) cell (PSCell).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology and/or sixth generation (6G) radio access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein.

SUMMARY

Figure 1:
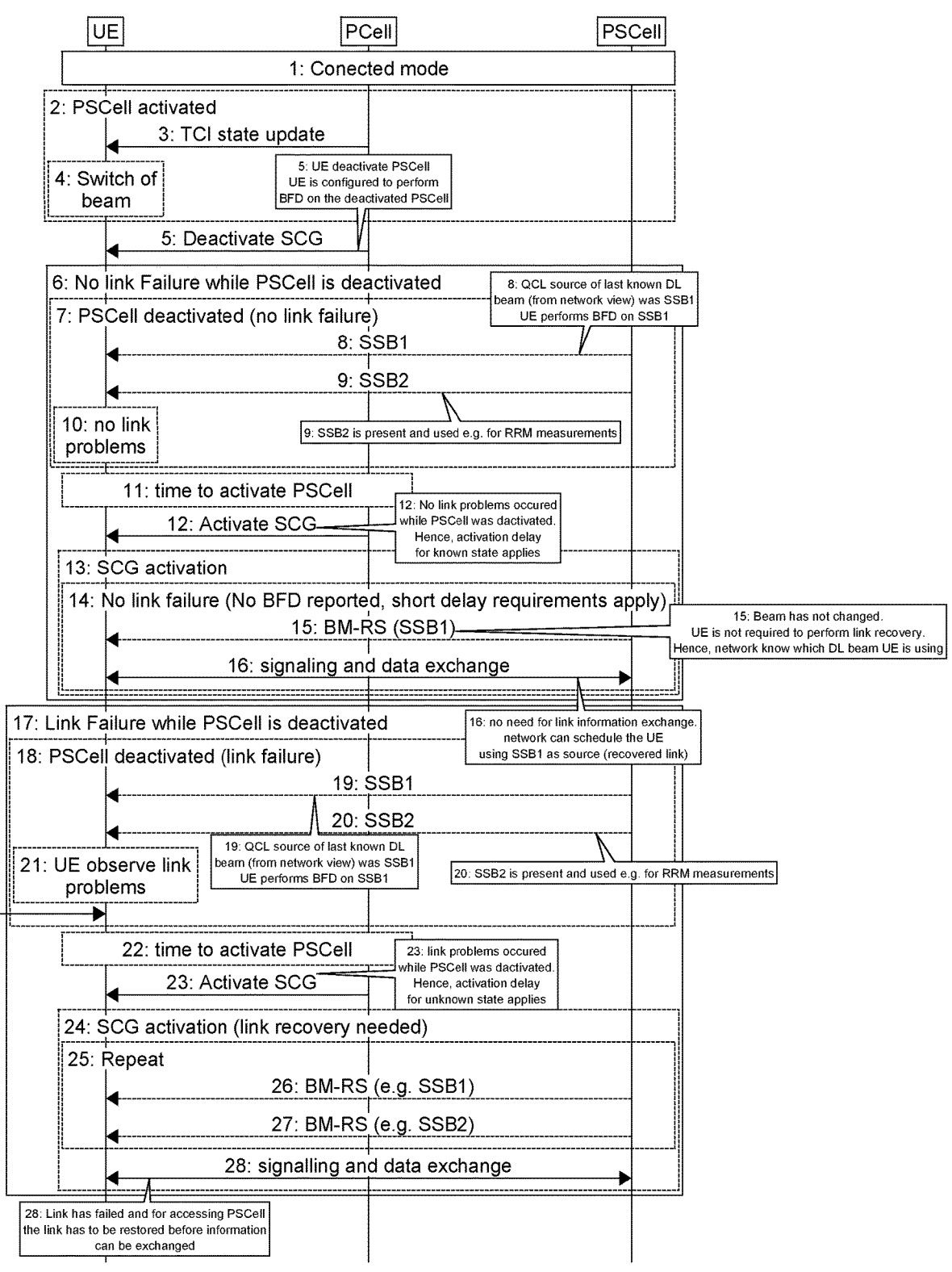
FIG. 1 illustrates an example signaling diagram, according to an embodiment.

In accordance with some example embodiments, a method may include performing, by a user equipment, at least one of beam failure detection or radio link monitoring on a deactivated secondary cell; receiving, from a network node, an activation command for the deactivated secondary cell; determining whether at least one of the deactivated secondary cell or a transmission configuration indicator (TCI) state is known based on at least one of a status of the beam failure detection or a status of the radio link monitoring of the deactivated secondary cell; and determining an activation delay for activation of the deactivated secondary cell based on a result of the determination of whether the secondary cell or the TCI state is known.

In accordance with certain example embodiments, an apparatus may include means for performing at least one of beam failure detection or radio link monitoring on a deactivated secondary cell; means for receiving, from a network node, an activation command for the deactivated secondary cell; means for determining whether at least one of the deactivated secondary cell or a transmission configuration indicator (TCI) state is known based on at least one of a status of the beam failure detection or a status of the radio link monitoring of the deactivated secondary cell; and means for determining an activation delay for activation of the deactivated secondary cell based on a result of the determination of whether the secondary cell or the TCI state is known.

In accordance with various example embodiments, an apparatus may include at least one processor and at least one memory including computer program code. The at least one memory and the computer program code may be configured to, with the at least one processor, cause the apparatus to at least perform at least one of beam failure detection or radio link monitoring on a deactivated secondary cell; receive, from a network node, an activation command for the deactivated secondary cell; determine whether at least one of the deactivated secondary cell or a transmission configuration indicator (TCI) state is known based on at least one of a status of the beam failure detection or a status of the radio link monitoring of the deactivated secondary cell; and determine an activation delay for activation of the deactivated secondary cell based on a result of the determination of whether the secondary cell or the TCI state is known.

In accordance with some example embodiments, a non-transitory computer readable medium may be encoded with instructions that may, when executed in hardware, perform a method. The method may include performing at least one of beam failure detection or radio link monitoring on a deactivated secondary cell; receiving, from a network node, an activation command for the deactivated secondary cell; determining whether at least one of the deactivated secondary cell or a transmission configuration indicator (TCI) state is known based on at least one of a status of the beam failure detection or a status of the radio link monitoring of the deactivated secondary cell; and determining an activation delay for activation of the deactivated secondary cell based on a result of the determination of whether the secondary cell or the TCI state is known.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for enhanced activation of primary secondary cell (PSCell), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

A new concept of deactivated SCG and, hence, deactivated primary SCG cell (PSCell) are currently being implemented. Up until now, the PSCell has always been activated when configured. It has not been possible to have a deactivated PSCell and only SCells could be deactivated. However, it has now been provided that a PSCell (and SCG) can be deactivated. This means that UE activation and deactivation delay requirements for a PSCell should also be defined.

Currently, UE activation delays for SCell activation have been defined. Additionally, requirements for PSCell addition have been defined. However, these requirements cannot be applied directly for the activation of a deactivated PSCell.

When defining UE requirements for activation delays, the cell status of the cell being activated should be taken into account. The cell status may refer to whether the cell is newly measured and reported and additionally reported to the network. Known conditions have been defined for PSCell when the PSCell is added (which is not the same as activating a deactivated PSCell). In frequency range 1 (FR1) and frequency range 2 (FR2), the PSCell being added is known if it has been meeting the following conditions: (1) during the last 5 seconds before the reception of the PSCell configuration command, the UE has sent a valid measurement report for the PSCell being configured and one of the synchronization signal blocks (SSBs) measured from the PSCell being configured remains detectable according to the cell identification conditions specified in clause 9.3 of 3GPP TS 38.133, and (2) one of the SSBs measured from PSCell being configured also remains detectable during the PSCell configuration delay $T_{config\_PSCell}$ according to the cell identification conditions. Otherwise, the PSCell being added is unknown.

The actual activation delay for addition of the PSCell can be defined according to the following. Upon receiving PSCell addition in subframe n, the UE is capable to transmit physical random access channel (PRACH) preamble towards PSCell in FR2 (or FR1) no later than in slot $$n + \frac{T_{config\_PSCell}}{NR \text{ slot length}},$$

where: $T_{config\_PSCell} = T_{RRC\_delay} + T_{processing} + T_{search} + T_A + T_{PSCell\_DU} + 2$ ms, $T_{RRC\_delay}$ is the radio resource control (RRC) procedure delay, and $T_{processing}$ is the SW processing time needed by the UE, including radio frequency (RF) warm up period. For example, $T_{processing} = 40$ ms. $T_{search}$ may refer to the time for automatic gain control (AGC) settling and primary synchronization signal (PSS)/secondary synchronization signal (SSS) detection. If the target cell is known, $T_{search} = 0$ ms. If the target cell is unknown and the target cell Ês/Iot≥−2 dB, $T_{search} = 24*Trs$ ms. $T_A$ is time for fine time tracking and acquiring full timing information of the target cell. $T_A = 1*Trs$ ms for a known or unknown PSCell. $T_{PSCell\_DU}$ is the delay uncertainty in acquiring the first available PRACH occasion in the PSCell. $T_{PSCell\_DU}$ is up to the summation of SSB to PRACH occasion association period and 10 ms. It is noted that SSB to PRACH occasion associated period is defined in Table 8.1-1 of 3GPP TS 38.213. Trs is the SSB measurement timing configuration (SMTC) periodicity of the target cell if the UE has been provided with an SMTC configuration for the target cell in PSCell addition message, otherwise Trs is the SMTC configured in the measObjectNR having the same SSB frequency and subcarrier spacing. If the UE is not provided SMTC configuration or measurement object on this frequency, then Trs=5 ms assuming the SSB transmission periodicity is 5 ms. There is no requirement if the SSB transmission periodicity is not 5 ms. It is noted that, while some examples or embodiments refer to FR2, example embodiments are not limited to FR2. For instance, some example embodiments may also be applicable to FR1.

In view of the above, a problem arises in that either the network has to request the UE to send period reports for the deactivated PSCell or the PSCell enter unknown status, e.g., after 5 seconds. Additionally, the known conditions depend on conditions only known to the UE (e.g., the condition stating that one of the SSBs measured from PSCell being configured also remains detectable during the PSCell configuration delay $T_{config\_PSCell}$ according to the cell identification conditions specified in clause 9.3 of 3GPP TS 38.133), but is never fully known to the network.

Another aspect is the transmission configuration indication (TCI) state of a to be activated deactivated PSCell. Currently, it is expected that SCG activation delay requirements are to cover both known and unknown TCI state at time of activation. Regarding known TCI state for the deactivated PSCell, the most straight forward approach would be to reuse the existing known TCI state definition. The current definition of known TCI state is that the TCI state is known if certain conditions are met. In particular, during the period from the last transmission of the reference signal (RS) resource used for the layer 1 reference signal received power (L1-RSRP) measurement reporting for the target TCI state to the completion of active TCI state switch, where the RS resource for L1-RSRP measurement is the RS in target TCI state or QCLed to the target TCI state, TCI state switch command is received within 1280 ms upon the last transmission of the RS resource for beam reporting or measurement, the UE has sent at least 1 L1-RSRP report for the target TCI state before the TCI state switch command, the TCI state remains detectable during the TCI state switching period, the SSB associated with the TCI state remain detectable during the TCI switching period, and signal-to-noise ratio (SNR) of the TCI state≥−3 dB. Otherwise, the TCI state is unknown.

Additionally, there is currently no agreement that UE shall perform L1-RSRP measurements on a deactivated PSCell. Hence, interruption requirements related to UE performing L1-RSRP measurements on a deactivated PSCell are not defined.

The known TCI state definition depends on the L1-RSRP RS (1280 ms) and the last transmitted L1-RSRP report. However, the UE is not required to measure L1-RSRP on a deactivated PSCell. This leads to the problem that the TCI state of the PSCell can never be longer than 1280 ms. This causes a problem that, in many situations, the TCI state of the PSCell will be assumed unknown very soon after the PSCell has been deactivated. This is expected to lead to long activation delays for the PSCell as the UE would have to determine new downlink (DL) measurements for enabling a known TCI state. This can have the consequence that the network may chose not to deactivate the PSCell, and the PSCell may in fact never be deactivated due to the long activation delays.

A detailed activation delay requirement for the PSCell with known and/or unknown TCI state has not yet been defined. It can be seen from the current SCell activation delay that having known/unknown TCI state for the to be activated SCell is not included (mainly due to assuming that SCells are always collocated with the PCell or PSCell activating the SCell and hence TCI state is known by this assumption).

However, PSCell may or may not be collocated with the PCell activating the PSCell (most often it would be non-collocated). Therefore, the assumption regarding collocation and TCI state assumption used for SCell activation cannot be applied for the deactivated PSCell and when defining the PSCell activation delay requirements.

It should be noted that even if the radio conditions have not changed and the TCI state may still be valid, the network will not have access to such information as it is only known for the UE—if the UE performs the necessary measurements. Hence, the network can just assume known TCI state conditions for the deactivated PSCell.

In an embodiment, the UE may perform Radio link monitoring (RLM) and beam failure detection (BFD) on the deactivated PSCell. This may be based on being configured by the network. However, according to certain embodiments, performing RLM/BFD on the deactivated PSCell can be used to improve the activation delay for a deactivated PSCell.

According to an embodiment, the beam specific radio link (BFD) status of the deactivated PSCell may be used as additional information for defining when the PSCell is known and TCI state is known. Additionally, an embodiment may use the RLM status of the deactivated PSCell as additional information for defining when the PSCell is known.

Thus, based on the active TCI state (or beam) used, e.g., when the PSCell is deactivated (which is known to network), as long as the UE does not declare and potentially report beam link failure (BFD) for this TCI state (or beam) (e.g., using SCGFailureInformation), the PSCell may be considered to be known and the TCI state of the PSCell may be considered to be known.

According to some embodiments, if the UE declares beam link failure (BFD) for the active TCI state (or beam), e.g., used when the PSCell is deactivated (which is known to network), and potentially report link failure (BFD) for this TCI state (or beam) (e.g., using SCGFailureInformation), the PSCell may be considered to be known and the TCI state of the PSCell may be considered to be unknown. Alternatively, in an embodiment, if the UE does not detect beam link failure, and potentially report beam failure, for TCI state on the deactivated PSCell, the TCI state may be considered to be known.

In an embodiment, if the UE declares radio link failure (RLF) for the deactivated PSCell, and potentially report RLF for the deactivated PSCell (e.g. using SCGFailureInformation), the PSCell may be considered to be unknown and the TCI state of the PSCell may be considered to be unknown. Alternatively, in an embodiment, as long as the UE does not declare, and potentially report, RLF on the deactivated PSCell the PSCell is considered to be known.

In some situations the UE is configured to perform link recovery procedures for the deactivated PSCell. Hence, it can continuously monitor if beam failure occurs. As long as the UE does not detect DL radio link problems for the active beam (active TCI state), the DL beam is still known and valid for the UE (both for the UE and the network based on status and latest TCI state configured, e.g., at PSCell deactivation, if UE indicates or reports the link failure to the network). If link problems occur and failure is declared by the UE, this information is known to the UE and may be reported to network. Hence, if indicated or reported, the network will also be aware of the status and afterward the DL beam used by the UE may be considered unknown. This can apply to RLM and RLF as well.

Some embodiments may define known PSCell conditions for the deactivated PSCell (covering both RLM and BFD). According to certain embodiments, in FR1 and/or FR2, the deactivated PSCell being activated is considered to be known if it has been meeting the following conditions: (1) the UE is configured to perform beam link monitoring (BFD) and/or Radio Link Monitoring (RLM) in the deactivated PSCell, (2) during the period from the PSCell deactivation to the completion of PSCell activation, while PSCell was deactivated, the UE has not detected beam failure or radio link failure, the UE has not (if configured) reported beam failure or radio link failure for the PSCell before the PSCell activation command, and one of the SSBs measured from the PSCell being configured remains detectable according to the cell identification conditions, and (3) one of the SSBs measured from PSCell being configured also remains detectable during the PSCell activation delay $T_{Activation\_PSCell}$ according to the cell identification conditions. Otherwise, the deactivated PSCell may be considered to be unknown. Additionally, in this example embodiment, when the PSCell is considered to be unknown, then the TCI state for the PSCell may also be considered to be unknown.

Some embodiments may define known TCI state conditions for the deactivated PSCell (covering both RLM and BFD). For example, in certain embodiments, the TCI state is considered to be known for a deactivated PSCell if the following conditions are met: (1) the UE is configured to perform beam link monitoring (BFD) in the deactivated PSCell, and (2) during the period from the PSCell deactivation to the completion of PSCell activation, while PSCell was deactivated, the UE has not detected beam failure or radio link failure, the UE has not, if configured, reported beam failure or radio link failure for the PSCell before the PSCell activation command, the TCI state remains detectable while the PSCell is deactivated, the SSB associated with the TCI state remain detectable during the PSCell activation period, and the SNR of the TCI state≥−3 dB. Otherwise, the TCI state may be considered to be unknown.

It is noted that the explanations provided above are just one example, and it should be understood that the actual definition and rules could be phrased differently.

It is also noted that example embodiments, and the improvements provided thereby, are not limited to PSCell but can also be applied, e.g., for deactivated SCell provided that the UE performs the appropriate measurements (e.g., RLM and/or BFD) and potential reporting related to the deactivated SCell.

FIG. 1 illustrates an example signaling diagram depicting an enhanced activation of PSCell, according to an embodiment. As illustrated in the example of FIG. 1, the diagram may include signaling between a UE, PCell, and/or PSCell. For instance, FIG. 1 illustrates an example of an embodiment that may be applied by a UE for defining the PSCell activation delay. The example of FIG. 1 utilizes the BFD and known PSCell as examples; however, as mentioned above, example embodiments can also be applied for other scenarios that may or may not be illustrated in the example of FIG. 1. Certain embodiments may be applicable to a PSCell with more than one beam (BFD based approach), and/or to a PSCell with only one beam (RLM based approach).

As illustrated in the example of FIG. 1, at 1, the UE may be in connected mode and, at 2, the PSCell may be activated. While the PSCell is activated, the UE may have the beam, i.e., TCI state, continuously kept up to date by performing the necessary L1-RSRP measurements and reporting these measurement results to the network. Then, as illustrated at 3, when needed, the network (e.g., the PCell or PSCell) may order a TCI state change or update (DL beam change) to the UE.

As illustrated in the example of FIG. 5, at 5, the network (PCell) may signal the UE to deactivate PSCell, and the UE may be configured to perform BFD on the deactivated PSCell. In certain embodiments, it may be assumed that the TCI state for the PSCell is known once the network instructs the UE to deactivate the PSCell. Hence, the TCI state of the deactivated PSCell may be considered to be known as a starting point (when PSCell is deactivated).

In this example, the UE may be configured to perform BFD while the PSCell is deactivated by continuously monitoring the beam link radio conditions according to the defined requirements. In an embodiment, the UE can perform link measurements for a known PSCell. For instance, FIG. 1 illustrates an example, as shown at 6 and 7, where the UE may detect no link failure while the PSCell is deactivated. As illustrated at 8, the QCL source of the last known DL beam (from the network point of view) may be SSB1, and the UE may therefore perform BFD on SSB1. At 9, SSB2 is present and may be used, e.g., for RRM measurements. As shown at 10, no link problems are detected by the UE. At 11, it is time to activate to the PSCell and, at 12, the network may signal to the UE to activate the SCG. Since no link problems occurred while the PSCell was deactivated, the activation delay for known TCI state may apply. Thus, according to certain embodiments, if the UE receives a PSCell activation command and no beam failure has been detected on the PSCell while the PSCell was deactivated, it may be assumed that the beam (TCI state) for the deactivated PSCell is known, e.g., unchanged from when the PSCell was deactivated. As a result, it may also be considered that the PSCell is known. In this case, the PSCell activation delay requirements for a known PSCell can apply, and there is no need for link recovery and, at 12, the activation delay for the activation of the PSCell can be based on known conditions. As illustrated at 13, the PSCell may be activated and, at 14, no BFD is reported and short delay requirements may be apply. At 15, the beam has not changed and the UE is not required to perform link recovery. Hence, the network knows which DL beam the UE is using. As illustrated at 16, there is no need for link information exchange and the network can schedule the UE using SSB1 as the source.

FIG. 1 illustrates another example, as shown at 17 and 18, where the UE may detect link failure while the PSCell is deactivated. As illustrated at 19, the QCL source of the last known DL beam (from the network point of view) may be SSB1, and the UE may therefore perform BFD on SSB1. At 20, SSB2 is present and may be used, e.g., for RRM measurements. As shown at 21, link problems may be detected by the UE. At 22, it is time to activate to the PSCell and, at 23, the network may signal to the UE to activate the SCG. Since link problems occurred or were detected by the UE while the PSCell was deactivated, the activation delay for unknown TCI state may apply. Therefore, for the situation where the UE detects a beam failure (or RLF) on the deactivated PSCell, the TCI state of the PSCell is no longer regarded as known and additional delay for link recovery can be applied. However, the activation requirements for the known PSCell can apply potentially with an added additional delay for beam/link recovery. Similarly, for the situation where UE detects a RLF on the deactivated PSCell, the TCI state of the PSCell is no longer regarded as known (i.e., is considered unknown) and, in this case, the PSCell may also be regarded as unknown. Hence, the activation requirements for the unknown PSCell can apply and an additional delay for additional cell/beam/link recovery can be applied. As further illustrated in the example of FIG. 1, at 24, the PSCell may be activated and cell and potentially link recovery may be needed since the UE detected a cell and beam failure. At 26, BM-S (e.g., SSB1) may be transmitted to the UE and, at 27, BM-RS (e.g., SSB2) may be transmitted to the UE. As shown at 25, procedures 26 and 27 may be repeated. Since the link has failed, in order to access the PSCell, the link has to be restored before information can be exchanged as shown at 28.

It can be observed that, by applying the example method(s) described above according to certain embodiments, the activation delay for a deactivated PSCell can be significantly reduced for the case where no beam failure has occurred while the PSCell was deactivated. Additionally, if no RLF has occurred on the PSCell while it was deactivated, then the PSCell activation delay can be reduced beyond the 5 seconds, according to some embodiments.

For both scenarios (e.g., no beam failure and/or no RLF), the activation delay can be reduced and maintained shorter than possible if applying legacy definitions and UE behaviour. This is possible as the PSCell known status is kept true for a longer period. Additionally, if the beam failure and the RLF is signalled to the network, then the network will be aware of the PSCell status and expected longer or shorter activation delay. It can be seen that the delay may be increased especially due to the cell and/or link recovery procedures, as shown at 25 in the example of FIG. 1, which is not needed for the known PSCell.

According to some example embodiments, the difference in activation delay may be be up to 24*Trs, which with an assumed Trs=20 ms would be 480 ms. Hence, according to an example embodiment, the PSCell activation delay may be defined as:

$$T_{Activation\_PSCell} = T_{RRC\_delay} + T_{RF\_warmup} + T_{search} + T_\Delta + T_{PSCell\_DU} + T_{RS\_processing}\ ms,$$

where: $T_{RRC\_delay}$ is the RRC procedure delay (e.g., as specified in 3GPP TS 38.331), $T_{RF\_warmup}$ is the RF warm up delay, and $T_{search}$ is the time for AGC settling and PSS/SSS detection. If the target cell is known, $T_{search}$=0 ms. If the target cell is unknown and the target cell Ês/Iot≥−2 dB, $T_{search}$=24*Trs ms. $T_A$ is time for fine time tracking and acquiring full timing information of the target cell. $T_A$=1*Trs ms for a known PSCell, or $T_A$=0 ms for an unknown PSCell. $T_{RS\_processing}$ is 2 ms for Trs processing. With respect to $T_{PSCell\_DU}$, if the PSCell is activated without PRACH transmission it is the delay uncertainty in acquiring the first available PRACH occasion in the PSCell. $T_{PSCell\_DU}$ is up to the summation of SSB to PRACH occasion association period and 10 ms. It is noted that SSB to PRACH occasion associated period is defined in Table 8.1-1 of 3GPP TS 38.213. If the PSCell is activated without PRACH transmission, $T_{PSCell\_DU}$ is the delay (in ms) including uncertainty in acquiring the first available CSI reporting resources as specified in 3GPP TS 38.331. Hence, in an embodiment, upon receiving PSCell activation command in subframe n, the UE may be capable to transmit PRACH preamble towards PSCell in FR2 no later than in slot $$n + \frac{T_{Activation\_PSCell}}{NR \text{ slot length}},$$

where: $T_{Activation\_PSCell}$=$T_{RRC\_delay}$+$T_{RF\_warmup}$+$T_{search}$+$T_A$+$T_{PSCell\_DU}$+$T_{RS\_processing}$ ms.

In view of the above, the activation delay difference between known and unknown conditions can be significant. However, by applying example embodiments described herein PSCell activation delay can be decreased.

It is noted that FIG. 1 discussed above is provided as one example, and other examples are possible according to certain embodiments. For instance, while FIG. 1 is described with respect to activation of a PSCell, certain embodiments are equally applicable to the activation of a SCell or the like.

Figure 2:
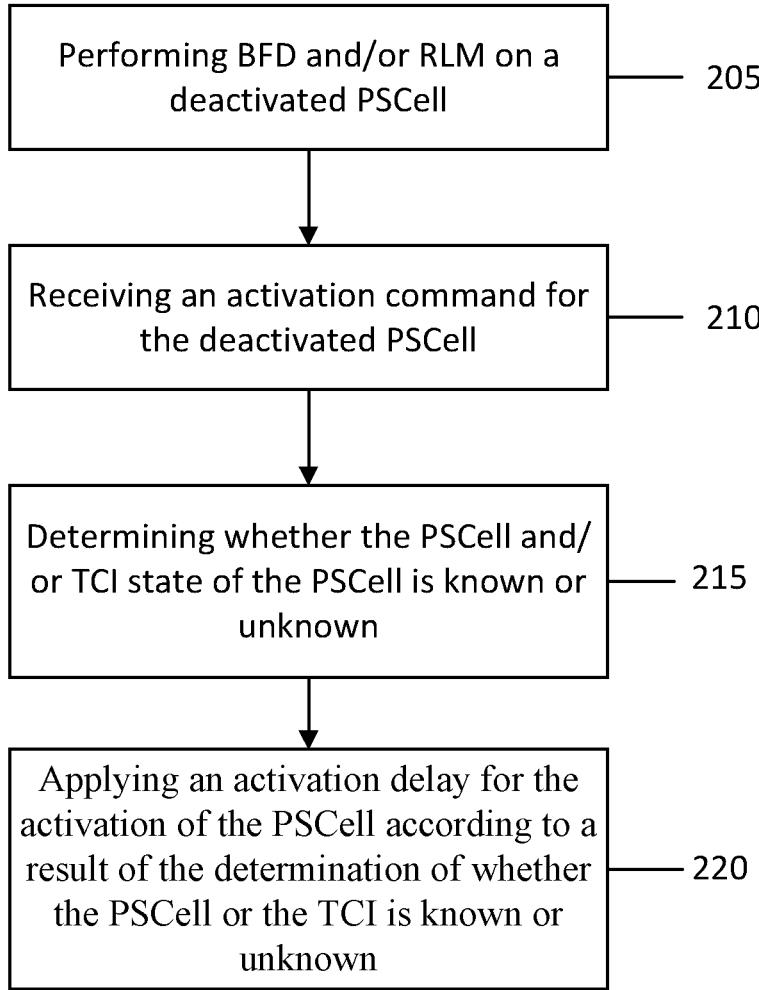
FIG. 2 illustrates an example flow diagram of a method, according to an embodiment.

FIG. 2 illustrates an example flow diagram of a method for activation of primary secondary cell (PSCell), according to an example embodiment. For instance, the method of FIG. 2 can be used to improve the activation delay for a deactivated primary secondary cell (PSCell). In certain example embodiments, the flow diagram of FIG. 2 may be performed by a network entity or communication device in a communications system such as, but not limited to, LTE or 5G NR. For instance, in some example embodiments, the communication device performing the method of FIG. 2 may include a UE, sidelink (SL) UE, wireless device, mobile station, IoT device, UE type of roadside unit (RSU), a wireless transmit/receive unit, customer premises equipment (CPE) other mobile or stationary device, or the like. For instance, in certain example embodiments, the method of FIG. 2 may include one or more of the procedures or operations performed by the UE, as described or illustrated elsewhere herein, such as in FIG. 1.

As illustrated in the example of FIG. 2, the method may include, at 205, performing at least one of beam failure detection (BFD) and/or radio link monitoring (RLM) on a deactivated primary secondary cell (PSCell). In an embodiment, the method may also include, at 210, receiving, from a network node, an activation command for the deactivated primary secondary cell (PSCell). According to certain embodiments, the method may include, at 215, determining whether at least one of the primary secondary cell (PSCell) and/or a transmission configuration indicator (TCI) state of the primary secondary cell (PSCell) is known based on at least one of a status of the beam failure detection (BFD) or a status of the radio link monitoring (RLM) of the primary secondary cell (PSCell). In an embodiment, the method may also include, at 220, applying an activation delay for the activation of the primary secondary cell (PSCell) according to a result of the determination of whether the primary secondary cell (PSCell) or the transmission configuration indicator (TCI) is known.

According to an embodiment, when the status of the beam failure detection (BFD) indicates that beam failure has not been detected on the primary secondary cell (PSCell) while it was deactivated, the determining 215 may include determining that the transmission configuration indicator (TCI) state is known and the primary secondary cell (PSCell) is known. In this case, the applying 220 may include applying activation delay requirements for a known primary secondary cell (PSCell).

In an embodiment, when the status of the beam failure detection (BFD) indicates that beam failure has been detected on the primary secondary cell (PSCell) while it was deactivated, the determining 215 may include determining that the transmission configuration indicator (TCI) state is unknown. In this case, the applying 220 may include applying an additional delay to the activation delay for link or beam recovery.

According to an embodiment, when the status of the radio link monitoring (RLM) indicates that a radio link failure has been detected on the primary secondary cell (PSCell) while it was deactivated, the determining 215 may include determining that the transmission configuration indicator (TCI) state is unknown and the primary secondary cell (PSCell) is unknown. In this case, the applying 220 may include applying activation requirements for an unknown primary secondary cell (PSCell) and applying an additional delay to the activation delay for link or beam recovery.

It should be noted that, although certain embodiments are described above with respect to a PSCell, example embodiments are not merely limited to a PSCell. For example, certain embodiments can also be applied for a deactivated SCell, e.g., provided that the UE performs the appropriate measurements (e.g., RLM and/or BFD) and reports on the deactivated SCell.

Figure 3:
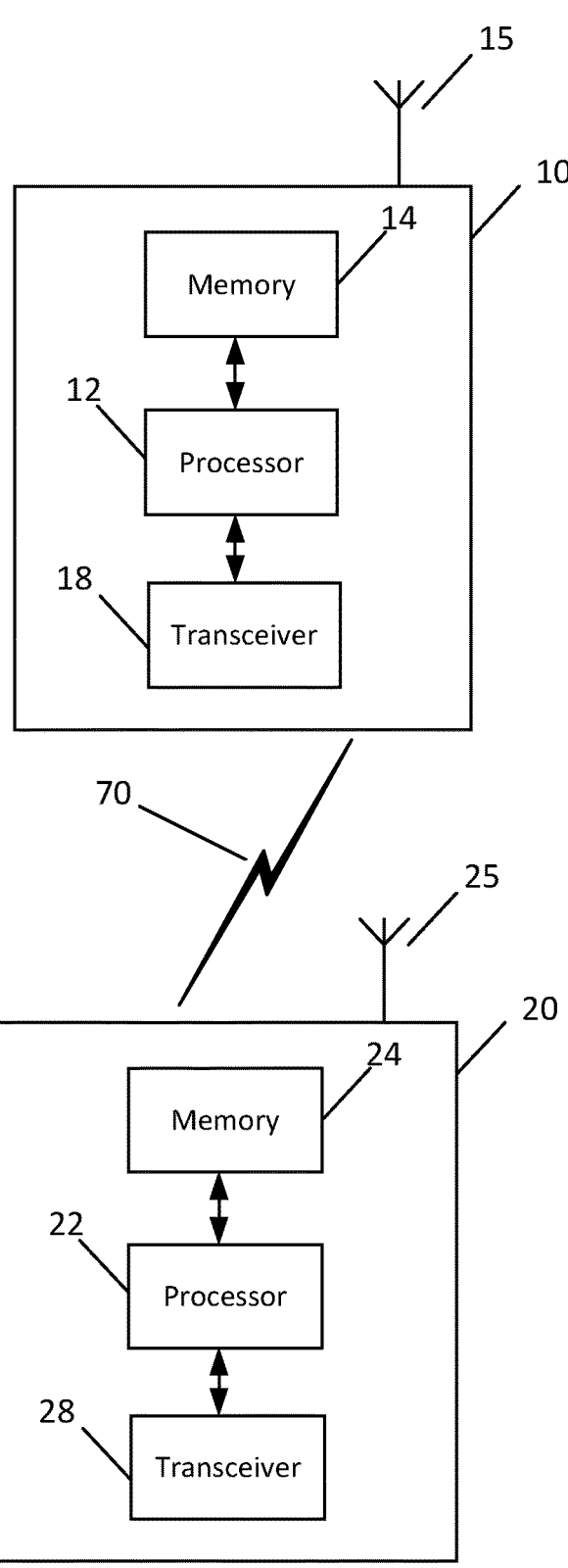
FIG. 3 illustrates an example of apparatuses, according to certain embodiments.

FIG. 3 illustrates an example of an apparatus 10 and apparatus 20, according to certain example embodiments. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, Remote Radio Head (RRH), integrated access and backhaul (IAB) node, and/or a WLAN access point, associated with a radio access network, such as a LTE network, 5G or NR. In some example embodiments, apparatus 10 may be gNB or other similar radio node, for instance. In some embodiments, apparatus 10 may be a or may represent a PSCell and/or PCell as shown in FIG. 1.

It should be understood that, in some example embodiments, apparatus 10 may comprise an edge cloud server as a distributed computing system where the server and the radio node may be stand-alone apparatuses communicating with each other via a radio path or via a wired connection, or they may be located in a substantially same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 3.

As illustrated in the example of FIG. 3, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 3, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, Wireless Local Area Network (WLAN), Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 10 may be or may be a part of a network element or RAN node, such as a base station, access point, Node B, eNB, gNB, TRP, RRH, HAPS, IAB node, relay node, WLAN access point, satellite, or the like. In one example embodiment, apparatus 10 may be a HAPS or other aircraft having a radio node. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIG. 1 and/or FIG. 2, or any other method described herein. For example, in some embodiments, apparatus 10 may be configured to perform one or more of the operations or procedures performed by the PCell and/or PSCell in the example of FIG. 1. In some embodiments, as discussed herein, apparatus 10 may be configured to perform a procedure relating to enhanced activation of PSCell (or SCell). For instance, in some embodiments, apparatus 10 may be controlled by memory 14 and processor 12 to improve the activation delay for the activation of a deactivated PSCell, as described elsewhere herein.

FIG. 3 further illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, CPE, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 3.

As illustrated in the example of FIG. 3, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as Orthogonal Frequency-Division Multiple Access (OFDMA) or Orthogonal Frequency Division Multiplexing (OFDM) symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22.

The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, CPE, or the like, for example. According to certain embodiments, apparatus 20 may be controlled by memory 24 and processor 22 to perform the functions associated with any of the embodiments described herein, such as one or more of the operations illustrated in, or described with respect to, FIG. 1 or FIG. 2, or any other method described herein. For example, in some embodiments, apparatus 20 may be configured to perform one or more of the operations or procedures performed by the UE in the example of FIG. 1, and/or to perform one or more of the procedures illustrated in FIG. 2. In an embodiment, apparatus 20 may be controlled to perform a process relating to enhanced activation of PSCell (or SCell), as described in detail elsewhere herein. For example, in certain embodiments, apparatus 20 may be controlled to perform a method that improves the activation delay associated with activation of a deactivated PSCell.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, sensors, circuits, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. For example, as discussed in detail above, certain example embodiments can improve and enhance at least the activation delay for a deactivated PSCell. For instance, some embodiments may be configured use RLM and/or BFD that is performed on the deactivated PSCell to improve the activation delay for the deactivated PSCell. It is noted that these improvements are not limited to PSCell but can also be applied, for example, for deactivated SCell provided the UE performs the appropriate measurements (e.g., RLM and/or BFD) and reports on the deactivated SCell. As a result, example embodiments can reduce signaling, latency and/or power consumption, for instance. Accordingly, the use of certain example embodiments results in improved functioning of communications networks and their nodes, such as base stations, eNBs, gNBs, and/or IoT devices, UEs or mobile stations, or the like.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-execut-able components which, when the program is run, are configured to carry out some example embodiments. The one or more computer-executable components may be at least one software code or portions of code. Modifications and configurations needed for implementing the functional-ity of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommu-nications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, some func-tionality of example embodiments may be implemented as a signal that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation proces-sor for executing the arithmetic operation(s).

Some embodiments described herein may use the con-junction "and/or". It should be noted that, when used, the term "and/or" is intended to include either of the alternatives or both of the alternatives, depending on the example embodiment or implementation. In other words, "and/or" can refer to one or the other or both, or any one or more or all, of the things or options in connection with which the conjunction is used.

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

I claim:

1. A method, comprising:

performing, by a user equipment, at least one of beam failure detection or radio link monitoring on a deactivated secondary cell;

receiving, from a network node, an activation command for the deactivated secondary cell;

determining whether the deactivated secondary cell and a transmission configuration indicator (TCI) state are known based on at least one of a status of the beam failure detection or a status of the radio link monitoring of the deactivated secondary cell; and determining an activation delay for activation of the deactivated secondary cell based on a result of the determination of whether the secondary cell and the TCI state are known.

2. The method of claim 1, wherein the secondary cell comprises a primary secondary cell.

3. The method of claim 1, wherein, when the status of the beam failure detection indicates that beam failure has not been detected on the secondary cell while it was deactivated, the determining whether the deactivated secondary cell and the TCI state are known comprises determining that the TCI state is known.

4. The method of claim 1, wherein, when the status of the beam failure detection indicates that beam failure has not been detected on the secondary cell while it was deactivated, the determining whether the deactivated secondary cell and the TCI state are known comprises determining that the secondary cell is known.

5. The method of claim 4, wherein the determining activation delay comprises determining activation delay requirements for the known secondary cell.

6. The method of claim 1, wherein, when the status of the beam failure detection indicates that beam failure has been detected on the secondary cell while it was deactivated, the determining whether the deactivated secondary cell and the TCI state are known comprises determining that TCI state is unknown.

7. The method of claim 6, wherein the determining activation delay comprises determining an additional delay for link or beam recovery.

8. The method of claim 1, wherein, when the status of the radio link monitoring indicates that a radio link failure has been detected on the secondary cell while it was deactivated, the determining whether the deactivated secondary cell and the TCI state are known comprises determining that the TCI state is unknown and the secondary cell is unknown.

9. The method of claim 8, wherein the determining activation delay comprises determining activation requirements for the unknown secondary cell and determining an additional delay for link or beam recovery.

10. An apparatus, comprising:

at least one processor; and at least one memory comprising computer program code, the at least one memory and computer program code being configured, with the at least one processor, to cause the apparatus at least to:

perform at least one of beam failure detection or radio link monitoring on a deactivated secondary cell;

receive, from a network node, an activation command for the deactivated secondary cell;

determine whether the deactivated secondary cell and a transmission configuration indicator (TCI) state are known based on at least one of a status of the beam failure detection or a status of the radio link monitoring of the deactivated secondary cell; and determine an activation delay for activation of the deactivated secondary cell based on a result of the determination of whether the secondary cell and the TCI are known.

11. The apparatus of claim 10, wherein the secondary cell comprises a primary secondary cell.

12. The apparatus of claim 10, wherein, when the status of the beam failure detection indicates that beam failure has not been detected on the secondary cell while it was deactivated, the determining whether the deactivated secondary cell and the TCI state are known comprises determining that the TCI state is known.

13. The apparatus of claim 10, wherein, when the status of the beam failure detection indicates that beam failure has not been detected on the secondary cell while it was deactivated, the determining whether the deactivated secondary cell and the TCI state are known comprises determining that the secondary cell is known.

14. The apparatus of claim 13, wherein the determining activation delay comprises determining activation delay requirements for the known secondary cell.

15. The apparatus of claim 14, wherein the activation delay requirements comprise activation delay being zero.

16. The apparatus of claim 10, wherein, when the status of the beam failure detection indicates that beam failure has been detected on the secondary cell while it was deactivated, the determining whether the deactivated secondary cell and the TCI state are known comprises determining that TCI state is unknown.

17. The apparatus of claim 16, wherein the determining activation delay comprises determining an additional delay for link or beam recovery.

18. The apparatus of claim 10, wherein, when the status of the radio link monitoring indicates that a radio link failure has been detected on the secondary cell while it was deactivated, the determining whether the deactivated secondary cell and the TCI state are known comprises determining that the TCI state is unknown and the secondary cell is unknown.

19. The apparatus of claim 18, wherein the determining activation delay comprises determining activation requirements for the unknown secondary cell and determining an additional delay for link or beam recovery.

20. A non-transitory computer readable medium comprising program instructions that, when executed by an apparatus, cause the apparatus to perform at least:

performing at least one of beam failure detection or radio link monitoring on a deactivated secondary cell;

receiving, from a network node, an activation command for the deactivated secondary cell;

determining whether the deactivated secondary cell and a transmission configuration indicator (TCI) state are known based on at least one of a status of the beam failure detection or a status of the radio link monitoring of the deactivated secondary cell; and determining an activation delay for activation of the deactivated secondary cell based on a result of the determination of whether the secondary cell and the TCI state are known.

* * * * *